United States Patent [19]

Easley

[11] Patent Number: 4,771,563

[45] Date of Patent: Sep. 20, 1988

[54] ENVIRONMENT ENHANCEMENT DEVICE FOR ANIMAL SCENT USED BY HUNTER

[76] Inventor: Samuel D. Easley, 5730 Calmar Dr., Apt. 3B, Montgomery, Ala. 36116

[21] Appl. No.: 59,032

[22] Filed: Jun. 8, 1987

[51] Int. Cl.4 ............................................. F41C 27/00
[52] U.S. Cl. .......................................... 43/1; 43/129; 239/136
[58] Field of Search ...................... 43/1, 129; 239/136

[56] References Cited

U.S. PATENT DOCUMENTS

| | | | |
|---|---|---|---|
| 1,021,270 | 3/1912 | Scott et al. | 43/129 |
| 2,690,500 | 9/1954 | Winberg et al. | 43/129 X |
| 3,046,192 | 7/1962 | Bilyeu | 43/1 X |
| 3,421,841 | 1/1969 | Wittwer | 43/129 |
| 4,163,038 | 7/1979 | Nishimura et al. | 43/129 X |
| 4,326,119 | 4/1982 | Swiatosz | 239/136 X |

*Primary Examiner*—Nicholas P. Godici
*Assistant Examiner*—Carmine Cuda
*Attorney, Agent, or Firm*—Hovey, Williams, Timmons & Collins

[57] ABSTRACT

A lightweight, portable device maintains at a warm temperature a quantity of animal scent, particularly animal urine, which is used by hunters to attract animals. A battery operated heating element surrounding a chamber which removably receives a vial of the liquid scent maintains the temperature of the liquid above freezing when the device is used outdoors in cold weather, and preferably heats the scent to a temperature which closely imitates the fresh presence of live deer. The device includes a cap having two oppositely oriented threaded sections, one of the which when received on a housing of the device closes the chamber containing the liquid while the other when received on the housing enables vent openings formed in the cap to dissipate odors which emanate from the vial. Batteries of the device are located within an enlarged base and thus provide a low center of gravity, which allows the device to remain in a stable, upright orientation on the ground when desired.

6 Claims, 1 Drawing Sheet

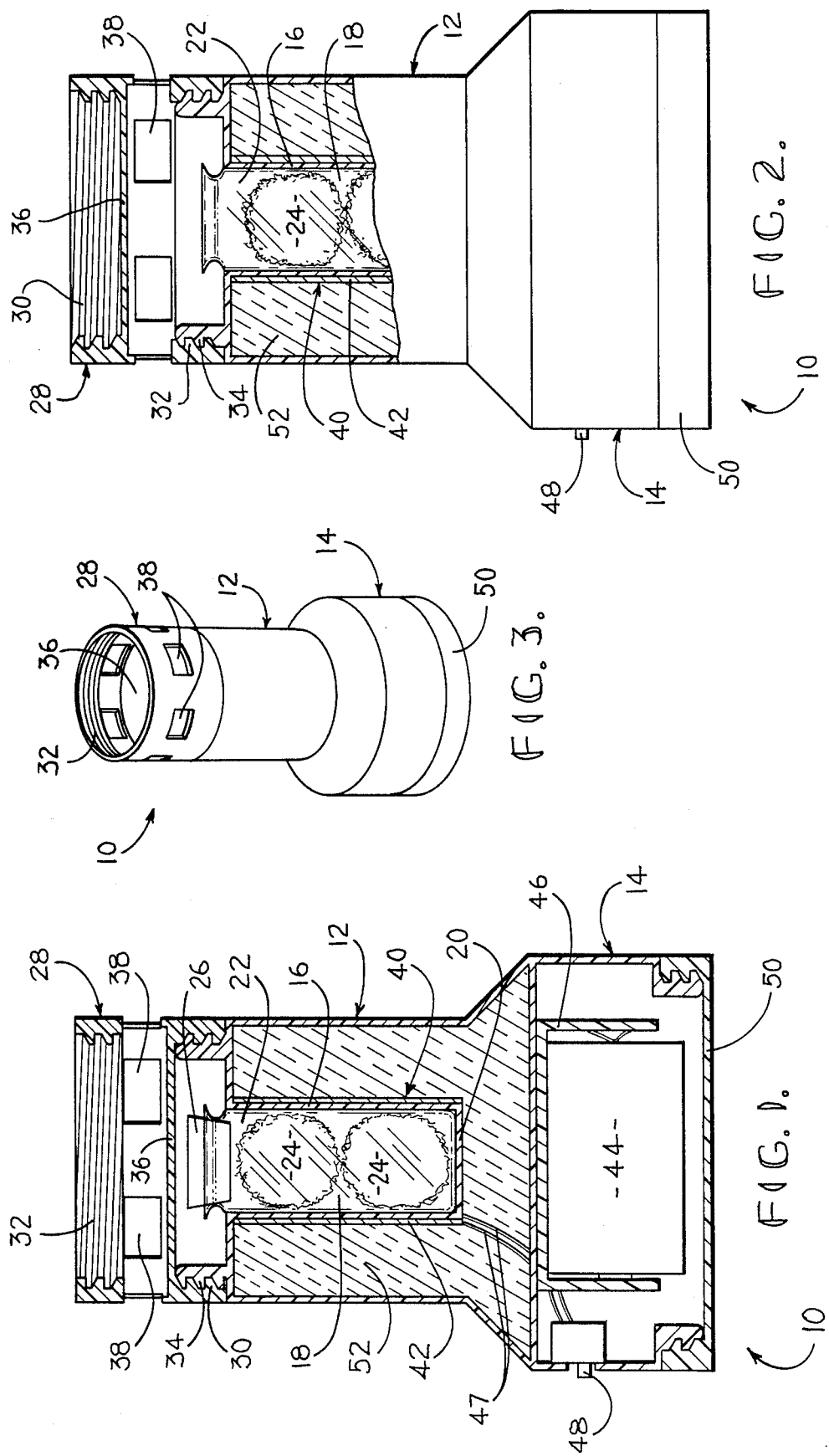

ENVIRONMENT ENHANCEMENT DEVICE FOR ANIMAL SCENT USED BY HUNTER

BACKGROUND OF THE INVENTION

1. Field of the Invention

This invention relates to a relatively small, hand-held device carried by hunters for receiving a removable vial and for thermally conditioning the contents of the vial which comprise liquid animal scent such as buck lure. More particularly, the invention concerns a device with an insulated housing having a chamber for receiving the vial, and a battery-operated heating element within the housing for retaining the liquid contents of the vial at a warm temperature above freezing, and to thereby cause vaporized portions of the animal scent emanating from the vial to closely imitate the odor of a live animal. In preferred embodiments of the invention, a cap threaded to the housing selectively vents vaporized portions of the animal scent from the chamber, while an enlarged base of the housing in cooperation with a low center of gravity of the device causes the housing to be stably retained in an upright position when left in a position standing on the ground.

2. Description of the Prior Art

Aromatic materials have long been used by hunters to lure or attract game animals toward a position within range of the hunter. In recent years, there has been increased interest in the use of scented materials which are comprised of urine of type of game which is being sought.

As an example, deer hunters may use scent which consists of the urine of doe in heat for attracting bucks to the position where the hunter is stationed. Alternatively, a scent comprised of buck urine may also be employed, since the dominant buck for a particular region upon smelling the scent of another buck will search the region in order to run the intruder out of his area.

In certain instances, deer hunters, utilizing the aforementioned liquid urine scents, hunt near scrape marks which have been formed in the ground by the hooves of the deer crossing the territory. In this regard, deer scrape the ground to provide a loction for defecation or urination, and consequently other deer will be attracted to the odors emanating from previously formed scrapes.

As a consequence, it is advantageous for bow hunters as well as gun hunters to distribute quantities of animal scent near the previously formed scrapes. A few drops of the liquid scent may be sprinkled in each of the scrapes within range, and in addition a bottle or vial containing some of the liquid scent may be left open on the ground, so that a portion of the liquid vaporizes in the air to further distribute the aroma.

Unfortunately, individuals hunting in sub-freezing ambient conditions have often found that the scent has frozen after a certain time in the field, rendering the relatively expensive product useless. In addition, containers or vials which are left on the ground for vaporization of the liquid scent occasionally tip due to the influence of wind or the like and spill the liquid contents onto the earth.

In an attempt to overcome these problems, hunters have in some instances maintained the scent in a liquid condition by positioning a vial of the scent in close proximity to conventional, known handwarmers of the type which will provide heat by flameless combustion of a petrochemical material. In these instances, however, it can be appreciated that the odor of the combustion by-products can significantly diminish the effectiveness of the animal scent. Furthermore, such practice does not provide a convenient means for supporting the container of scent in a stable, upright position in the field.

SUMMARY OF THE INVENTION

My present invention overcomes the disadvantages noted above by provision of a small hand-held warming device for scent which maintains the temperature of the scent at all times above freezing even when the device is exposed to relatively cold ambient conditions. The device has a heating element which surrounds a vial of the animal scent, and a battery power source provides sufficient energy for retaining the scented contents of the vial in a liquid condition.

In more detail, the environmental enhancement device of my invention takes the form of a generally cylindrical housing having walls defining an inner chamber which are of a configuration complemental to the shape of the vial of animal scent for removable reception of the same. Two D-cells disposed in the bottom of the housing power a nichrome heating element connected to the chamber walls in order to retain the temperature of the vial of animal scent and any contents therein at a temperature above freezing. A removable, threaded bottom cover normally sealed by an O-ring provides access to the batteries within the housing for replacement when necessary.

Preferably, the resistance of the heating elements is selected so that the temperature of the liquid scent is maintained at a value approximating the body temperature of the deer. In this manner, the liquid scent when dispersed on the ground vaporizes in a steam-like fashion, freshening the scrapes and closely imitating the effect which would otherwise be provided by a live deer. Good results have been observed in the field with use of the device of my present invention.

Advantageously, the top of the housing of the environmental enhancement device is threaded to receive either of two sets of threaded wall sections formed on a double-sided cap. When the device is not in use, one threaded wall section of the cap is tightened onto threaded, upper walls portions of the housing in order to completely seal the vial-receiving chamber within. Alternatively, when the device is to be placed on the ground, the cap is removed along with a stopper covering the vial, and the cap is turned over so that the opposite threaded wall section instead engages the threaded wall portions of the housing. In this latter position of the cap, vent openings formed in walls of the cap allow vapors to dissipate from the liquid scent contained in the vial, and the vent openings are positioned in such a manner that the entry of rain, snow or the like into the chamber is largely precluded.

Another, desirable feature of my invention is the optional provision of an enlarged base integrally formed as part of the generally cylindrical housing. The batteries are received in the base in disposition below the vial, and thus cause the device to have a relatively low center of gravity which ensures that the housing remains in an upright position when set on the ground. External surface areas of the housing are provided with a camoflauge design to enable the device to blend in with the surrounding environmental cover, and the synthetic resinous housing cooperates with foam insulation therein to largely preclude breakage of the glass vial if the device is accidently dropped.

DESCRIPTION OF THE DRAWINGS

FIG. 1 is a side cross-sectional view of the environmental enhancement device of my present invention, illustrating a housing removably receiving a vial of the liquid scent along with a heat source for maintaining the temperature of the scent above freezing;

FIG. 2 is a side elevational view of the device shown in FIG. 1 with a wall of the housing broken away in section, and illustrating a cap of the device disposed in a position opposite to that shown in FIG. 1 in order to allow vapors to be dissipated from the liquid within the vial; and FIG. 3 is a reduced, perspective view of the device which is shown in FIG. 1.

DETAILED DESCRIPTION OF THE DRAWINGS

An environmental enhancement device for liquid animal scent used by hunters is shown in FIGS. 1-3 and is broadly designated by the numeral 10. The device 10 includes a relatively small, hand-held housing 12 presenting an overall generally cylindrical configuration and having an upper, somewhat narrowed cylindrical region that is integrally connected to an enlarged, cylindrical base 14.

As shown in FIGS. 1 and 2, the housing 12 has wall portions 16 defining a cylindrical chamber 18 which is closed at the bottom by a flat wall 20 connected to wall portions 16. The diameter of the chamber 18 is slightly larger than the outer diameter of a container or vial 22 for complemental reception of the latter and for removal of the same when desired.

The vial 22, preferably comprised of glass, normally contains a quantity of liquid animal scent such as the urine of bucks, or the urine of doe in heat. Two cottonballs 24 may be optionally placed within the vial 22 along with the liquid scent. As depicted in FIG. 2, a tapered, frustoconical stopper 26 seals a narrowed neck portion of the vial 22 when it is desired to prevent discharge of scent in liquid or vapor form from vial 22.

A generally cylindrical cap 28, as illustrated in FIGS. 1-3, comprises a means for selectively venting vaporized portions of the animal scent from vial 22. Opposite sides of the cap 28 are provided with separate threaded wall sections 30, 32 which are each complemental in configuration to an upper, threaded wall portion 34 that is integrally formed as part of an upper, narrowed section of housing 12. A circular, flat wall 36 extending across inner reaches of the cap 28 is disposed between the first threaded wall section and the second threaded wall section 32.

A number of vent openings 38 are formed in upright sides of the cap 28 around the circumference of the same, and are located between the flat wall 36 and the second threaded wall section 32. Thus, and referring to FIG. 1, when the cap 28 is positioned such that the first threaded wall section 30 is tightened onto the threaded wall portion 34 of the housing 12, the flat wall 36 seals the chamber 18 as may be desirable, for instance, before the scent is to be dispersed in the field. At other times, however, the cap 28 may be removed from housing 12 and stopper 26 displaced from the neck of vial 22, and thereafter cap 28 may be turned over so that the second threaded wall section 32 engages the housing wall portion 34 as is shown in FIG. 2. In the position of FIG. 2, vapors of liquid scent within the vial 22 can dissipate through the vent openings 38 as, for instance, when the device 10 is placed upon the ground.

Particularly noteworthy is the fact that the vent openings 38 are disposed in the upright sides of the cap 28 so that the openings 38 may permit the escape of vapors from the vial 22 without allowing significant amounts of rainfall or the like from entering the chamber 18. The flat wall 36 of cap 28, being integrally formed with the sides of the cap 28, prevents the descent of rain into the chamber 18 from areas immediately overlying cap 28.

A source of heat, broadly designated 40, includes an electric heating element 42 thermally connected to and surrounding the cylindrical wall portions 16 of housing 12 which define chamber 18. The heating element 42 may be comprised of commercially available nichrome wire, and may be contained within a rubberized blanket as depicted in FIGS. 1 and 2 or alternatively may take the form of a helical coil of wire directly secured to the cylindrical wall portions 16.

The source of heat 40 also includes two batteries 44, one of which is shown in FIG. 1. The batteries, such as the type known as "D-cells", are received within an inverted, generally U-shaped battery bracket 46 having contacts that electrically engage appropriate end regions of the batteries 44. A set of electrical leads 47 interconnect the batteries 44, the heating element 42 and a switch 48 for selective activation of the source of heat 40.

Finally, a threaded bottom cover 50 is normally received within internally formed threads of the enlarged base 14 of housing 12. Viewing FIG. 1, the cover 50 provides selective access to the batteries 44 as may be desired, for example, when replacement of the latter is necessary. Although not shown, an O-ring seal may be disposed adjacent the threaded regions of the bottom cover 50 in order to preclude entry of moisture, dirt and the like.

In use of the device 10, the externally accessible switch 48 is manually shifted to activate the source of heat 40 and enable the batteries 44 to provide sufficient energy to operate the heating element 42. The cylindrical wall portions 16, being thermally coupled to the heating element 44, transfer heat to the vial 22 and the liquid animal scent contained therein in order to maintain the latter at a temperature above freezing.

Once the hunter approaches the selected territory in the field, the cap 28 is removed from the position shown in FIG. 1 and the stopper 26 is displaced from the neck of vial 22. At this time, a few drops of the animal scent within vial 22 may be dispersed in animal scrapes on the ground. Next, the cap 28 may be turned over, and the second threaded wall section 32 threaded onto the threaded wall portion 34 of housing 12 in the manner that is depicted in FIG. 2.

Next, the bottom cover 50 of the device 10 is placed upon the ground in an area, for example, near the scrapes. The temperature of the urine within the vial 22 is sufficiently warmed by the heating element 42 so that vapors will continuously emanate from the chamber 18 and escape through vent openings 38. The weight of the batteries 44, being centered within the enlarged base 14 in disposition below the vial 22, provides a low center of gravity to the device 10 so that same will remain in an upright, secure position in the field with the bottom cover 50 in firm engagement with the ground.

A quantity of insulation 52 may be disposed within the housing 12 as shown in FIGS. 1 and 2 in areas surrounding the heating element 42 and above a flat wall separating the battery chamber of base 14 from the remaining, inner regions of the housing 12. The insulation 52, preferably comprised of lightweight, expanded cellular foam material, reduces the escape of heat from the chamber 18 and vial 22 and conserves the energy available from batteries 44. In this manner, the temperature of the uine within vial 22 remains sufficiently warm for imitating the effects of the presence of live deer, such that steam-type vapors will readily dissipate into the air whenever the device 10 is tipped to enable droplets of the liquid urine to be dispersed onto the ground.

It is to be understood, of course, that various additions or modifications may be effected to the currently preferred embodiment chosen to illustrate my invention without detracting from the gist of my contribution to the art. Accordingly, the invention should be deemed to be limited only by a fair scope of the claims which follow along with their mechanical equivalents.

I claim:

1. An environmental enhancement device for liquid animal scent used by hunters comprising:
    a relatively small, hand-held housing having wall portions defining a chamber for receiving liquid animal scent;
    means for selectively venting vaporized portions of said animal scent from said chamber; and
    a source of heat coupled to said housing for warming animal scent in said chamber,
    said source of heat comprising an elastic heating element thermally connected to said wall portions defining said chamber and at least one battery electrically connected to said heating element,
    said at least one battery and said heating element being selectively operable to provide sufficient heat for substantially precluding freezing of said animal scent when said housing is placed outdoors in surrounding, sub-freezing ambient conditions,
    said housing including a bottom, and said means for selectively venting vaporized portions of said animal scent comprising a cap having vent openings disposed for substantially precluding the entry of rainwater into said chamber when said housing bottom is placed in a position in engagement with the ground,
    said housing including threaded wall portions, and said cap including two threaded sections each complementally engageable with said threaded wall portions, one of said threaded portions when in engagement with said threaded wall portion of said housing causing said vent openings of said cap to vent said chamber, the other of said threaded sections when in engagement with said threaded wall portions causing said chamber to be covered and not vented.

2. The invention as set forth in claim 1, wherein said cap is generally cylindrical and presents two, oppositely-oriented end portions and said threaded sections are each disposed within a respective one of said end portions.

3. The invention as set forth in claim 1, wherein said housing includes a bottom engageable with the ground, and said at least one battery is located within said housing, adjacent said bottom and generally below said chamber for providing a low center of gravity and for retaining said bottom in contact with the ground.

4. The invention as set forth in claim 1; and including a quantity of thermal insulation surrounding said chamber.

5. The invention as set forth in claim 1, wherein said at least one battery and said electric heating element are operable to provide sufficient heating for retaining the temperature of said animal scent at a value approximating the body temperature of deer.

6. In combination:
    a portable, hand-held housing having wall portions defining a chamber;
    a container complementally, removably received in said chamber for containing a quantity of liquid animal scent;
    cap means shiftably connected to said housing for movement between a position generally covering said chamber and a position substantially exposing said chamber;
    means for selectively venting said container in order to release a vaporized portion of said animal scent;
    a self-contained source of heat disposed within said housing for selectively warming said quantity of liquid scent,
    said source of heat including at least one battery and an electric heating element electrically coupled to said at least one battery,
    said electric heating element and said at least one battery being operable to provide sufficient heat for substantially precluding freezing of said liquid scent when said housing is exposed to sub-freezing environmental conditions; and
    cover means removably coupled to said container,
    said cover means being releasable from said container for enabling venting of said scent and having structure for re-securement to said container subsequent to releasement for retaining said scent within said container,
    said chamber being of sufficient dimensions for substantially enclosing said cover means therein when said cap means is in engagement with said housing.

* * * * *